United States Patent
D'Alo et al.

(10) Patent No.: US 11,582,375 B2
(45) Date of Patent: Feb. 14, 2023

(54) ENHANCED POINTING ANGLE VALIDATION

(71) Applicant: Argo AI, LLC, Pittsburgh, PA (US)

(72) Inventors: Richard S. D'Alo, San Jose, CA (US); Christopher N. St. John, Northville, MI (US)

(73) Assignee: ARGO AI, LLC, Pittsburgh, PA (US)

( * ) Notice: Subject to any disclaimer, the term of this patent is extended or adjusted under 35 U.S.C. 154(b) by 126 days.

(21) Appl. No.: 17/035,447

(22) Filed: Sep. 28, 2020

(65) Prior Publication Data

US 2022/0103730 A1    Mar. 31, 2022

(51) Int. Cl.
  *H04N 5/225* (2006.01)
  *G02B 27/30* (2006.01)
  *B60R 1/12* (2006.01)
  *G01S 17/89* (2020.01)

(52) U.S. Cl.
  CPC ............. *H04N 5/2257* (2013.01); *B60R 1/12* (2013.01); *G02B 27/30* (2013.01); *B60R 2001/1253* (2013.01); *G01S 17/89* (2013.01)

(58) Field of Classification Search
  CPC ................... H04N 5/2257; B60R 1/12; B60R 2001/1253; G02B 27/30; G01S 17/89; G01S 7/4972; G01B 11/272
  See application file for complete search history.

(56) References Cited

U.S. PATENT DOCUMENTS

| 7,184,136 B2 | 2/2007 | McHugh |
| 8,186,069 B1 | 5/2012 | Ho |
| 10,257,509 B2 | 4/2019 | Austin et al. |
| 2013/0250284 A1* | 9/2013 | Lienhart ............. G01B 11/272 356/138 |
| 2015/0277135 A1 | 10/2015 | Johnson |

FOREIGN PATENT DOCUMENTS

| CN | 207965170 U | 10/2018 |
| CN | 109632264 A * | 4/2019 ............ G01M 11/00 |
| CN | 109632264 A1 | 4/2019 |

OTHER PUBLICATIONS

Extended European Search Report of European patent application No. 21199104.7 dated Jan. 28, 2022, 20 pages.
Geckeler et al. "Aperture Alignment in Autocollimator-Based Deflectometric Profilometers", Review of Scientific Instruments, May 2016, vol. 87, issue 5, AIP Publishing, United States.

* cited by examiner

*Primary Examiner* — Sath V Perungavoor
*Assistant Examiner* — Tyler B Edwards
(74) *Attorney, Agent, or Firm* — Brooks Kushman P.C.

(57) ABSTRACT

Devices, systems, and methods are provided for enhanced pointing angle validation. A device may generate a collimated beam using a light source emitting a light beam through a fiducial target in an optical instrument. The device may capture an image fiducial target using a camera, wherein the camera is mounted on a mounting datum that is orthogonal to the collimated beam. The device may determine a pointing angle associated with camera based on the captured image of the fiducial target. The device may compare a location of the fiducial target in the image to an optical center of the camera. The device may determine a validation status of camera based on the location of the fiducial target in the image.

20 Claims, 6 Drawing Sheets

ENHANCED POINTING ANGLE VALIDATION

TECHNICAL FIELD

This disclosure generally relates to systems and methods for enhanced pointing angle validation.

BACKGROUND

Some vehicles are equipped with a sensor system to collect data relating to the current and developing state of the vehicle's surroundings. The proper performance of a vehicle depends on the accuracy of the sensor system. The sensor system may comprise visual spectrum cameras, laser-ranging devices (LIDARs), thermal sensors, or other types of sensors. The sensor system enables a vehicle to detect objects and obstacles in the vicinity of the vehicle and tracks the velocity and direction of pedestrians, other vehicles, traffic lights, or similar objects in the environment around the vehicle. However, these sensors should be aligned for the data to be reliable. Therefore, there is a need to enhance the alignment of sensors to ensure that the data is consistent in order not to undermine the vehicle control.

Figure 1:
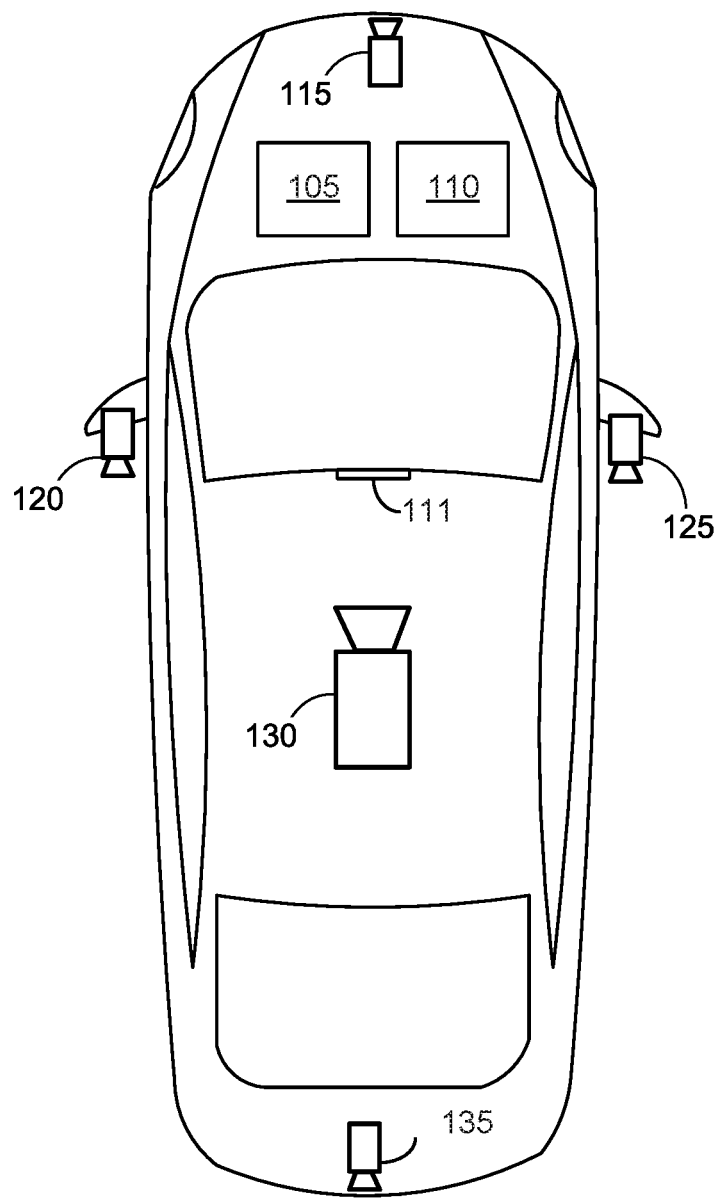
FIG. 1 illustrates an example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Many vehicles employ one or more cameras for various purposes. For example, a camera mounted a vehicle may be coupled to an electronic assembly having an image processing component that processes images in a video feed provided by the camera to detect other vehicles traveling in front of the vehicle. Proper operation of a camera is important to ensure that captured objects within camera frames are properly interpreted.

Applications that utilize cameras for computer and machine vision applications typically have very specific requirements regarding the orientation of how the cameras are mounted. One of these requirements is the pointing angle of the camera relative to the mounting mechanics of the camera. One aspect of specifying these tight requirements is having a method for measuring the pointing angle of a camera with a high degree of accuracy.

Example embodiments described herein provide certain systems, methods, and devices for enhanced pointing angle validation.

In one or more embodiments, an enhanced pointing angle validation system may facilitate a two-step process for alignment validation of a camera. The enhanced pointing angle validation system may align a collimated beam to a mounting datum on a fixture where a camera would be mounted. For example, the alignment validation system may align a light beam to be orthogonal to a mounting datum that will be used to mount the camera under test. This may be achieved by first mounting a mirror to the datum that will be used to mount the camera, and using an autocollimator to align the mounting datum such that the mirror is orthogonal to the beam. The autocollimator can be digital (with an internal camera and alignment calculation) or visual (with an eyepiece so the alignment is performed manually by visual inspection).

In one or more embodiments, an enhanced pointing angle validation system may facilitate in the first step of alignment validation where a light beam source may generate light beams that may run through an optic (e.g., collimator lens). The optic may create an image of the source when the beam is collimated such that all the rays from the light beam may be parallel to each other. Using an alignment mirror that is mounted adequately to a mounting datum, which is situated on an adjustment fixture that provides a fine adjustable tip/tilt to align the mirror to be orthogonal to the light beam.

In one or more embodiments, an enhanced pointing angle validation system may facilitate using an autocollimator as a collimator source to validate the alignment of a camera. In a second step of the two-step process, an enhanced pointing angle validation system may facilitate replacing the mirror with a camera under test. The camera under test may capture one or more images of a collimated source using the autocollimator. For example, after the alignment is achieved, the mirror is removed, the camera under test is mounted, and the autocollimator is used as a standard collimator. The collimated beam may be created with a light source that contains an image of a pinhole or other fiducial target. Since the light beam is collimated, the apparent image of the pinhole may be focused at infinity which appears to be infinitely far away, and any displacement of the image of the pinhole or other fiducial target, as imaged by the camera under test, may indicate a pointing angle deviation between the camera optical axis and the collimated beam. The pointing angle can be calculated using the values of the focal length of the optics in the camera under test and the optical center (a.k.a. principal point), which can be measured externally to this test and used as input.

In one or more embodiments, an enhanced pointing angle validation system may collect data associated with captured images of objects situated in the line of sight of a camera under test. For example, the data may indicate a location of an aperture (e.g., a pinhole or another fiducial target) image within the image plane relative to the optical center of the camera. The enhanced pointing angle validation system may use the data captured by the camera to determine the relative location of objects within an image. The enhanced pointing angle validation system may perform calculations to determine the pointing angle of the camera. The enhanced pointing angle validation system may facilitate one or more calculations to validate whether the camera under test meets the required performance based on comparing the pointing angle to various thresholds.

In one or more embodiments, an enhanced pointing angle validation system may determine deviations between the optical center of the camera under test and the aperture image. For example, the pointing angle of the camera under test may then be compared to an angle deviation threshold to determine whether the camera under test is aligned to an expected level. For example, in case the pointing angle is greater than the deviation threshold, then the alignment of the camera may be determined to be in a failed state. If the pointing angle is less than or equal to the deviation threshold, then the alignment of the camera may be determined to be in a pass state.

In one or more embodiments, an enhanced pointing angle validation system may facilitate one or more design parameters associated with a design of an autocollimator. The design of the autocollimator may need to adhere to the one or more design parameters such that the autocollimator provides enough pixels across the measured image of the aperture image (e.g., a collimator pinhole or fiducial as imaged by the camera under test). The one or more design parameters may be based on the size of the aperture (e.g., a diameter of a pinhole, length of a slot, etc.), the number of required pixels across an image taken by the camera, the collimator focal length, the camera focal length, and/or the pixel size.

In one or more embodiments, an enhanced pointing angle validation system may facilitate advantages such that an autocollimator may be used as both a setup tool to align the beam to be orthogonal to known mechanical datum and after the alignment has been performed the autocollimator may be used as a collimated source for the camera under test. Current approaches to testing cameras with collimated beams do not have a standard mechanism of setting the initial alignment, so the pointing angle of a camera cannot be accurately measured. Using an autocollimator will also allow for a beam alignment that has an accuracy that is orders of magnitude better than typical, and even tight, requirements for pointing angle in computer and machine vision camera systems.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an exemplary vehicle 100 equipped with multiple cameras. The vehicle 100 may be one of various types of vehicles such as a gasoline-powered vehicle, an electric vehicle, a hybrid electric vehicle, or an autonomous vehicle, and can include various items such as a vehicle computer 105 and an auxiliary operations computer 110.

The vehicle computer 105 may perform various functions such as controlling engine operations (fuel injection, speed control, emissions control, braking, etc.), managing climate controls (air conditioning, heating, etc.), activating airbags, and issuing warnings (check engine light, bulb failure, low tire pressure, vehicle in blind spot, etc.).

The auxiliary operations computer 110 may be used to support various operations in accordance with the disclosure. In some cases, some or all of the components of the auxiliary operations computer 110 may be integrated into the vehicle computer 105. Accordingly, various operations in accordance with the disclosure may be executed by the auxiliary operations computer 110 in an independent manner. For example, the auxiliary operations computer 110 may carry out some operations associated with providing camera settings of one or more cameras in the vehicle without interacting with the vehicle computer 105. The auxiliary operations computer 110 may carry out some other operations in cooperation with the vehicle computer 105. For example, the auxiliary operations computer 110 may use information obtained by processing a video feed from a camera to inform the vehicle computer 105 to execute a vehicle operation such as braking.

In the illustration shown in FIG. 1, the vehicle 100 is equipped with five cameras. In other scenarios, fewer or a greater number of cameras may be provided. The five cameras include a front-facing camera 115, a rear-facing camera 135, a roof-mounted camera 130, a driver-side mirror camera 120, and a passenger-side mirror camera 125. The front-facing camera 115, which may be mounted upon one of various parts in the front of the vehicle 100, such as a grille or a bumper, produces images that may be used, for example, by the vehicle computer 105 and/or by the auxiliary operations computer 110, to interact with an automatic braking system of the vehicle 100. The automatic braking system may slow down the vehicle 100 if the images produced by the front-facing camera 115 indicate that the vehicle 100 is too close to another vehicle traveling in front of the vehicle 100.

Any of the various cameras (e.g., cameras 115, 120, 125, 130, and 135) should not be interrupted from its normal function under the presence of electromagnetic interferences such as a radiated immunity event, a radiated emissions event, or a conducted emissions event. Those events cause degradation of captured images using these cameras. Captured data by the cameras (e.g., cameras 115, 120, 125, 130, and 135) may be raw data that is sent to a vehicle computer 105 and/or by the auxiliary operations computer 110 in order to convert the optical image into processed signals. Therefore, it is desirable to enhance the testing and validation of these various cameras before real-world applications (e.g., being on the road) to ensure that they do not provide inconsistent or unreliable image quality that undermines their normal operation.

The rear-facing camera 135 may be used, for example, to display upon a display screen of an infotainment system 111, images of objects located behind the vehicle 100. A driver of the vehicle 100 may view these images when performing a reversing operation upon the vehicle 100.

The roof-mounted camera 130 may be a part of a vehicle navigation system when the vehicle 100 is an autonomous vehicle. Images produced by the roof-mounted camera 130 may be processed by the vehicle computer 105 and/or by the auxiliary operations computer 110 for detecting and identifying objects ahead and/or around the vehicle. The roof-mounted camera 130 can have a wide-angle field-of-view and/or may be rotatable upon a mounting base. The vehicle 100 can use information obtained from the image processing to navigate around obstacles.

The driver-side mirror camera 120 may be used for capturing images of vehicles in an adjacent lane on the driver side of the vehicle 100, and the passenger-side mirror camera 125 may be used for capturing images of vehicles in adjacent lanes on the passenger side of the vehicle 100. In an exemplary application, various images captured by the driver-side mirror camera 120, the passenger-side mirror camera 125, and the rear-facing camera 135 may be combined by the vehicle computer 105 and/or by the auxiliary operations computer 110 to produce a computer-generated image that provides a 360-degree field-of-coverage around the vehicle 100. The computer-generated image may be displayed upon a display screen of the infotainment system 111 to assist the driver to drive the vehicle 100.

The various cameras provided in the vehicle 100 can be any of various types of cameras and can incorporate various types of technologies. For example, a night-vision camera having infra-red lighting and sensors may be used for capturing images in low light conditions. The low light conditions may be present when the vehicle 100 is parked at a spot during the night. The images captured by the night-vision camera may be used for security purposes, such as for preventing vandalism or theft. A stereo camera may be used to capture images that provide depth information that may be useful for determining separation distance between the vehicle 100 and other vehicles when the vehicle 100 is in motion. In another application where minimal processing latency is desired, a pair of cameras may be configured for generating a high frame-rate video feed. The high frame-rate video feed may be generated by interlacing the video feeds of the two cameras. In yet another application, a camera system configured for light detection and ranging (LIDAR) applications may be used. LIDAR applications can include long-distance imaging and/or short distance imaging. Some camera systems may include power-saving features that may be useful for operations in certain environments.

It is understood that the above descriptions are for purposes of illustration and are not meant to be limiting.

Figure 2:
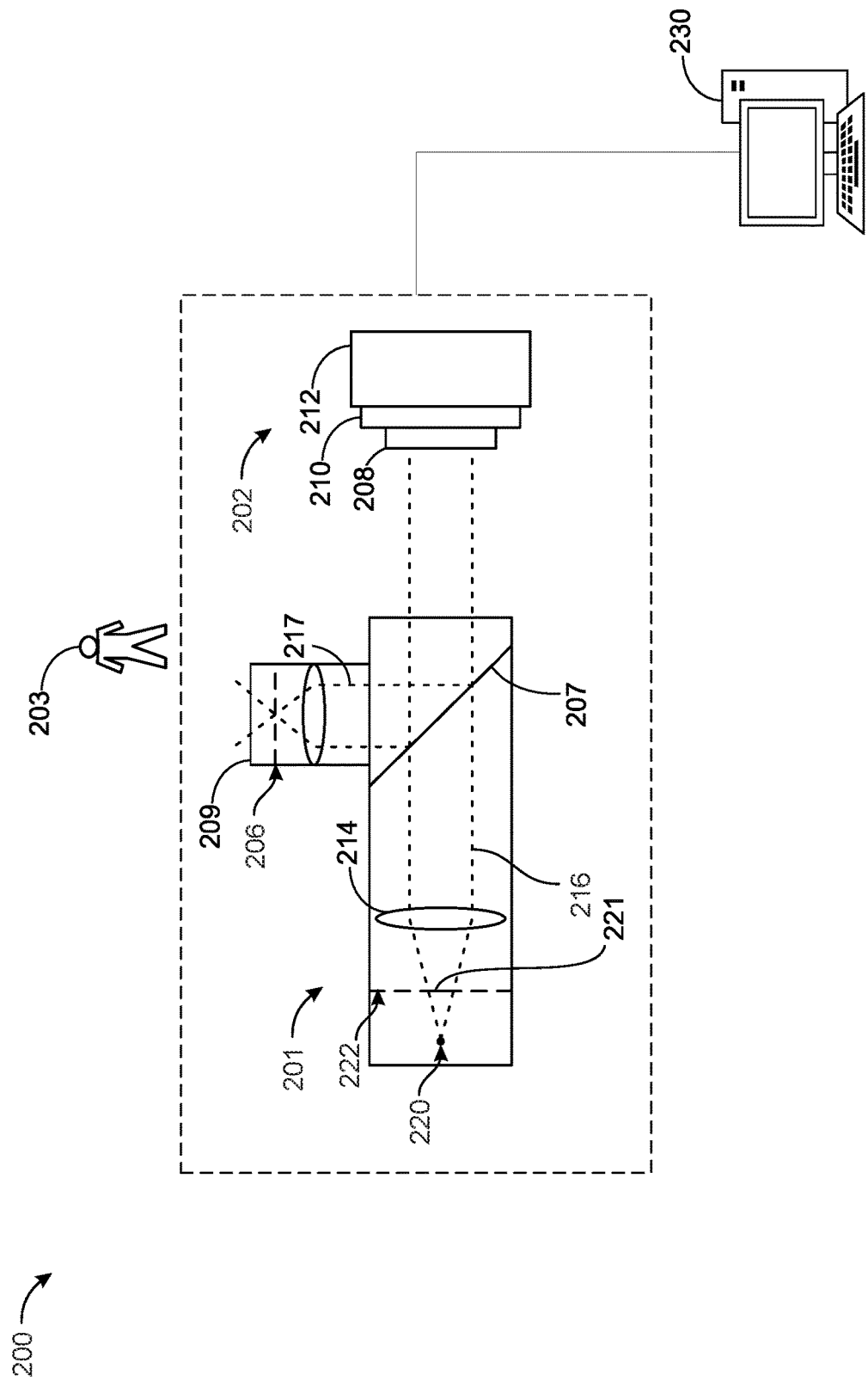
FIG. 2 depicts an illustrative schematic diagram for enhanced pointing angle validation, in accordance with one or more example embodiments of the present disclosure.

FIG. 2 depicts an illustrative schematic diagram 200 for enhanced pointing angle validation, in accordance with one or more example embodiments of the present disclosure.

Referring to FIG. 2, there is shown an autocollimator 201 situated in front of a structure 202. The autocollimator 201 and the structure 202 may be manually controlled by a user 203 or by a computer system 230. An autocollimator 201 may be an optical instrument for non-contact measurements. The autocollimator 201 typically used to align components and measure deflections in optical or mechanical systems. An autocollimator works by projecting an image onto a target mirror and measuring the deflection of the returned image against a scale, either visually or by means of an electronic detector.

The autocollimator 201 of FIG. 2 shows a source 220 that may emit light beams through an aperture 221 (e.g., a pinhole, or any other opening or fiducial target used for alignment and pointing angle measurement). The aperture 221 may be an opening (e.g., a crosshair or other fiducial target) on a wall 222. The light beams may go through the aperture 221 and then hit a collimator lens 214. The collimator lens 214 causes the generation of collimated beams (e.g., collimated beams 216), which are parallel to each other and travel through the autocollimator 201 before arriving at a beam splitter 207, which cause the collimated beams 216 to pass through the beam splitter 207 and hit the structure 202. The structure 202 may be comprised of an object 208 (e.g., a mirror or a camera), a mounting fixture (a datum) 210 to affix the object onto, and an adjustment fixture 212 to allow fine adjustable tip or tilt movement. In the example of FIG. 2, the object 208 is a mirror that causes a reflection of the collimated beams 216, which would then get deflected at a certain orientation compared to the original collimated beams 216 and the beam splitter 207 acts as a mirror to reflect the collimated beam towards the focusing lens that causes the collimated beams 217 to converge to a single point on an alignment reticle 206 that can be viewed through an eyepiece 209. The alignment reticle 206 may have a crosshair type marking that the focused light is incident on. Fine adjustments are made using the adjustment fixture 212 so that the single point is concentric with the center of the crosshair on the alignment reticle 206. Alignment of the focused spot of the image of the aperture 221 on the center of the alignment reticle ensures that the collimated beam 216 is orthogonal to the object 208. These adjustments may be made visually (e.g., by a user 203) or electronically by the computer system 230. The mounting fixture 210 would be considered to be aligned with the autocollimator 201 when the mounting fixture 210 is orthogonal to the collimated beams 216.

It is understood that the above descriptions are for purposes of illustration and are not meant to be limiting.

Figure 3:
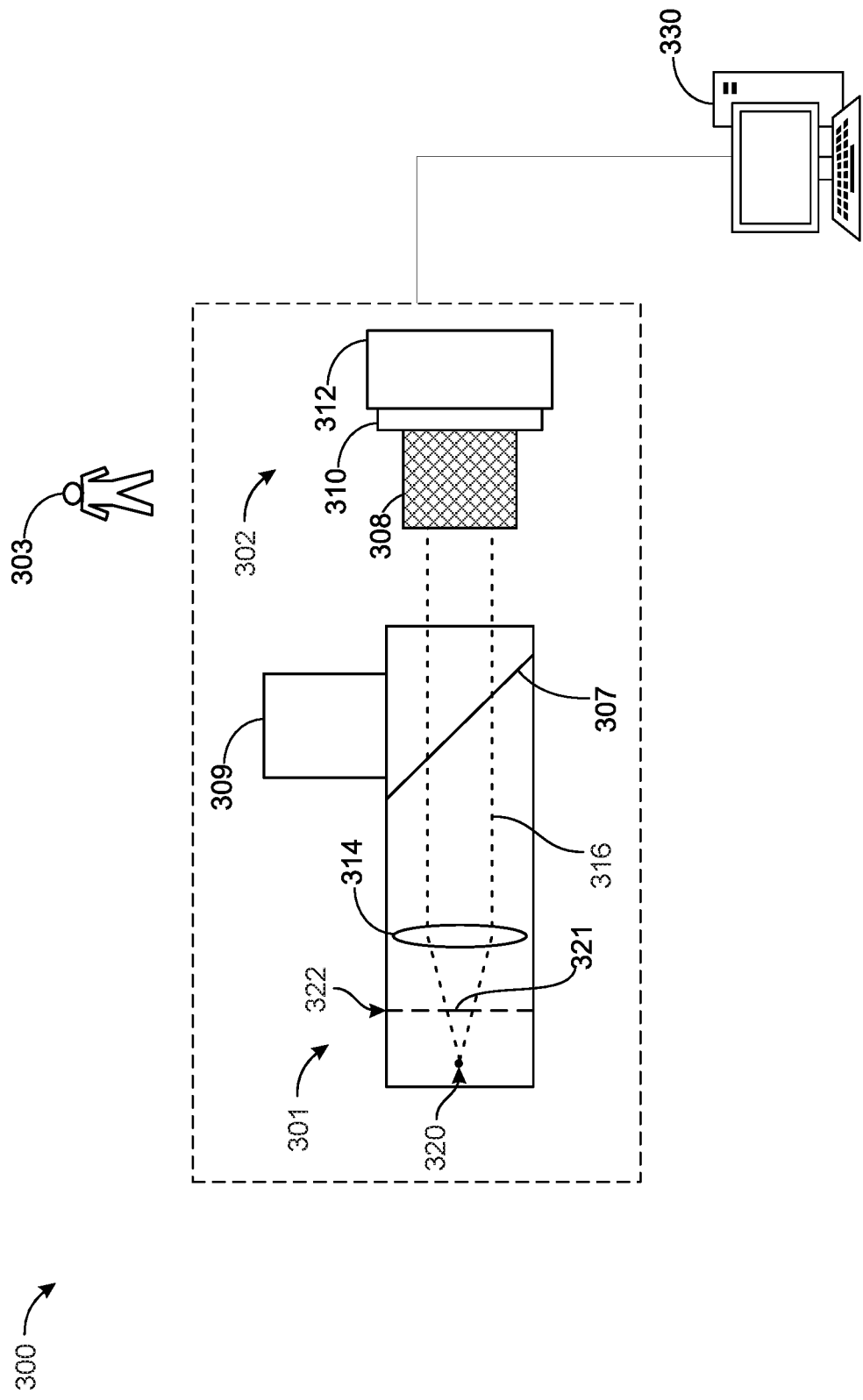
FIG. 3 depicts an illustrative schematic diagram for enhanced pointing angle validation, in accordance with one or more example embodiments of the present disclosure.

FIG. 3 depicts an illustrative schematic diagram 300 for enhanced pointing angle validation, in accordance with one or more example embodiments of the present disclosure.

Before a camera is mounted for testing at a camera-mounting fixture, the alignment process is performed (step 1, as shown in FIG. 2). The alignment shown in FIG. 2 involves aligning the light source beam at the light source fixture to be orthogonal to a mounting datum (camera-mounting fixture) used to mount the camera under the test condition. A mirror is mounted to the datum, and an autocollimator at the source fixture is used to assist in adjustments of the mounting datum such that the mirror is orthogonal to the light source beam. The autocollimator can be digital or visual.

After the alignment is achieved, the mirror is removed from the camera-mounting fixture, the camera is mounted, and the autocollimator is used as a standard collimator for the light beam from the light source. A collimated beam is created from the light source using the autocollimator that contains an image of a pinhole or other fiducial target. The collimated beam allows the apparent image of the pinhole to appear infinitely far away, and any displacement of the image from the pinhole will indicate a pointing angle error in the camera. The pointing angle can be calculated using values of the focal length of the optics in the camera under test and the optical center. Thus, the autocollimator is used as a setup tool for the testing and is also subsequently used as a collimator for the light source beam during the test.

Referring to FIG. 3, there is shown a collimator 301 situated in front of a structure 302. The collimator 301 and the structure 302 may be controlled by a computer system 330 and or by a user 303. The collimator 301 may be an optical instrument for non-contact measurement of angles. The collimator 301 is different from the autocollimator 201 of FIG. 2 in that the eyepiece 309 and the beam splitter 307 are bypassed and not used in this stage of validation.

The collimator 301 shows a source 320 that may emit light beams through an aperture 321 (e.g., a pinhole, or any other small opening). The aperture 321 may be an opening (e.g., crosshair, or other fiducial target) on a wall 322. The light beams may go through the aperture 321 and then hit a collimator lens 314. The collimator lens 314 causes the generation of collimated beams (e.g., collimated beams 316), which are parallel to each other and travel through the collimator 301 before arriving at the structure 302. The structure 302 may include a camera 308 attached to a mounting fixture (a datum) 310 and an adjustment fixture 312 to allow fine adjustable tip or tilt movement.

The camera 308 may capture an image of the source 320 through the collimated beams 316, which creates an image of an infinity because of the collimated beams 316 are parallel to each other. Using a relationship between the focal length of the optics of the camera and a determined shift in the center of the image space, it may be possible to determine the point angle of the camera. Usually, an article may be used for aligning and checking a mechanical step (e.g., as shown in FIG. 2). However, by taking into account the focal length of the camera lens, the aperture size and shape, and/or the design of the collimator 301, an enhanced pointing angle validation system may facilitate the alignment validation of the camera 308. The aperture 321 may allow light from the source 320 to penetrate and be received by the camera. A focal length represents where the apparent refraction is happening within the camera. The focal length indicates how far the light beams have to travel inside the camera, and will play a part in determining the final size of the pinhole as imaged by the camera 308. The optical center of the camera 308 accounts for where the optical axis intersects the image plane. It can be referred to as the center of the camera, or the optical center. Due to manufacturing and other considerations, there may be a lateral shift between the lens and the sensor in the camera causing a shift to where the apparent center of the camera is. This information on where the center of the camera is located is typically provided by the vendor of the camera for example, in the technical specifications of the camera. The apparent center of the camera may be used as a reference center to be compared to where the image of the source 320 during validation of the camera 308. It is understood that the above descriptions are for purposes of illustration and are not meant to be limiting.

Figure 4:
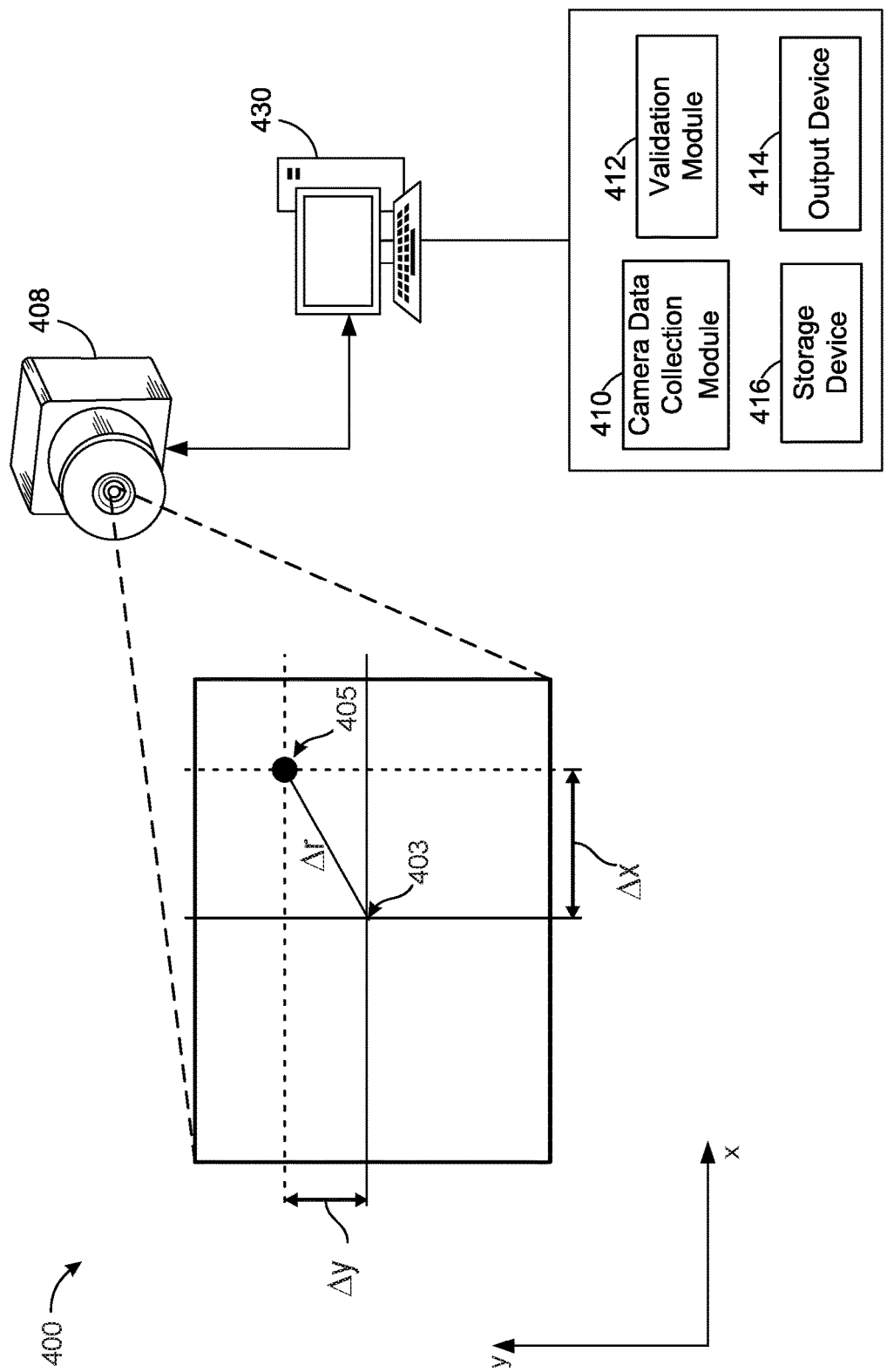
FIG. 4 depicts an illustrative schematic diagram for enhanced pointing angle validation, in accordance with one or more example embodiments of the present disclosure.

FIG. 4 depicts an illustrative schematic diagram 400 for enhanced pointing angle validation, in accordance with one or more example embodiments of the present disclosure.

After the alignment of the mounting fixture (e.g., mounting fixture 210 of FIG. 2) to the collimated beam is performed (as described above in FIG. 2), the camera under test (e.g., camera 408) is used to capture images of the source 320 as its light beams are collimated (e.g., collimated beams 316) using the collimator 301 of FIG. 3. The image of the aperture captured using the camera 408 may be compared to the optical center 403 of the camera, which may be provided by the camera manufacturer. The focal length of the camera ($f_{cam}$) may be used in the calculation, which may also be based on a manufacturer's measured data.

Since the beam is collimated (e.g., collimated beams 316 of FIG. 3), the apparent image of the aperture is infinitely far away, and any displacement of the image of the aperture, as imaged by the camera under test, will indicate a pointing angle error. The pointing angle can be calculated using the values of the focal length of the optics in the camera under test and the optical center (a.k.a. principal point), which can be measured externally to this test and used as input.

Referring to FIG. 4, there is shown a comparison of the aperture image 405 and the optical center 403 of the camera. The image plane may be shown using an x-axis and a y-axis.

In one or more embodiments, an enhanced pointing angle validation system may utilize a computer system 430 that may include one or more modules to perform the alignment validation of the camera 408. The computer system 430 comprises, at least in part, a camera data collection module 410, a validation module 412, and output device 414, and/or a storage device 416. The camera data collection module 410 may collect data associated with captured images of objects situated in the line of sight of the camera 408. For example, the data may indicate a location of the aperture image 405 within the image plane relative to the optical center 403. The validation module 412 may use the data captured by the camera data collection module 410 to determine the relative location of objects within an image. The validation module 412 may perform calculations to determine the pointing angle of the camera 408 (designated as θ). The validation module 412 may utilize the following formulas to validate whether the camera 408 meets the required performance based on comparing the pointing angle θ to various thresholds.

$$\Delta r = \sqrt{\Delta x^2 + \Delta y^2} \quad (1)$$

$$\theta = \frac{\Delta r}{f_{cam}} \quad (2)$$

$$\theta_x = \frac{\Delta x}{f_{cam}} \quad (3)$$

$$\theta_y = \frac{\Delta y}{f_{cam}} \quad (4)$$

The above formulas (1) to (4) show various deviations between the optical center 403 of the camera 408 and the aperture image 405. For example, Δx may be a deviation on the x-axis and Δy is a deviation on the y-axis on the image plane, while Δr represents the distance between the optical center 403 of the camera and the aperture image 405 on the image plane. The pointing angle θ may be calculated based on the Δr and the focal length of the camera (as seen in formula (2) above). Formulas (3) and (4) show the pointing angle deviation along the x-axis and the y-axis, respectively. The pointing angle θ may then be compared to an angle deviation threshold to determine whether the camera 408 of FIG. 3 is aligned to an expected level. For example, in case the pointing angle θ is greater than the deviation threshold, then the alignment of the camera 408 may be determined to be in a failed state. If the pointing angle θ is less than or equal to the deviation threshold, then the alignment of the camera 408 may be determined to be in a pass state. In other scenarios, the pointing angles relative to the x-axis or the y-axis may be, individually or in combination, compared to an x-axis angle deviation threshold and/or a y-axis angle deviation threshold. In some scenarios, it would be required to ensure that the pointing angles $\theta_x$ or $\theta_y$ are below the respective angle deviation thresholds.

The output device 414 may facilitate presenting a result of the validation module 412 on a display that may be interpreted by a user of the computer system 430. The storage device 416 may store the result of the validation performed by the validation module 412.

In one or more embodiments, to get a good measure of where the centroid of the camera is (e.g., the optical center 403 of the camera), a design of an autocollimator may need to follow certain parameters such that it provides enough pixels across the measured image of the aperture. However, not too large to the point that the image of the aperture is not clearly visible since the aperture is small in size. The design requirements may be based on the size of the aperture (e.g., a diameter of a pinhole, length of a slot, etc.), the number of pixels across an image taken by the camera, and/or the pixel pitch (density of pixels)). It should be noted that a pixel pitch is a distance from the center of a pixel to the center of an adjacent pixel. Since pixel pitch indicates the amount of space between two pixels, a smaller pixel pitch means there is less empty space between pixels. The following formula shows the constraint on the design of the autocollimator.

$$\frac{f_{coll}}{d} < \frac{f_{cam}}{np} \quad (5)$$

Where n is the number of pixels across the image of the reticle feature, p is the pixel pitch, $f_{cam}$ is the camera under test focal length, and $f_{coll}$ is the autocollimator focal length.

Based on (5), an autocollimator (e.g., autocollimator 201 or collimator 301) can be designed to ensure that the equation (5) is met.

It is understood that the above descriptions are for purposes of illustration and are not meant to be limiting.

Figure 5:
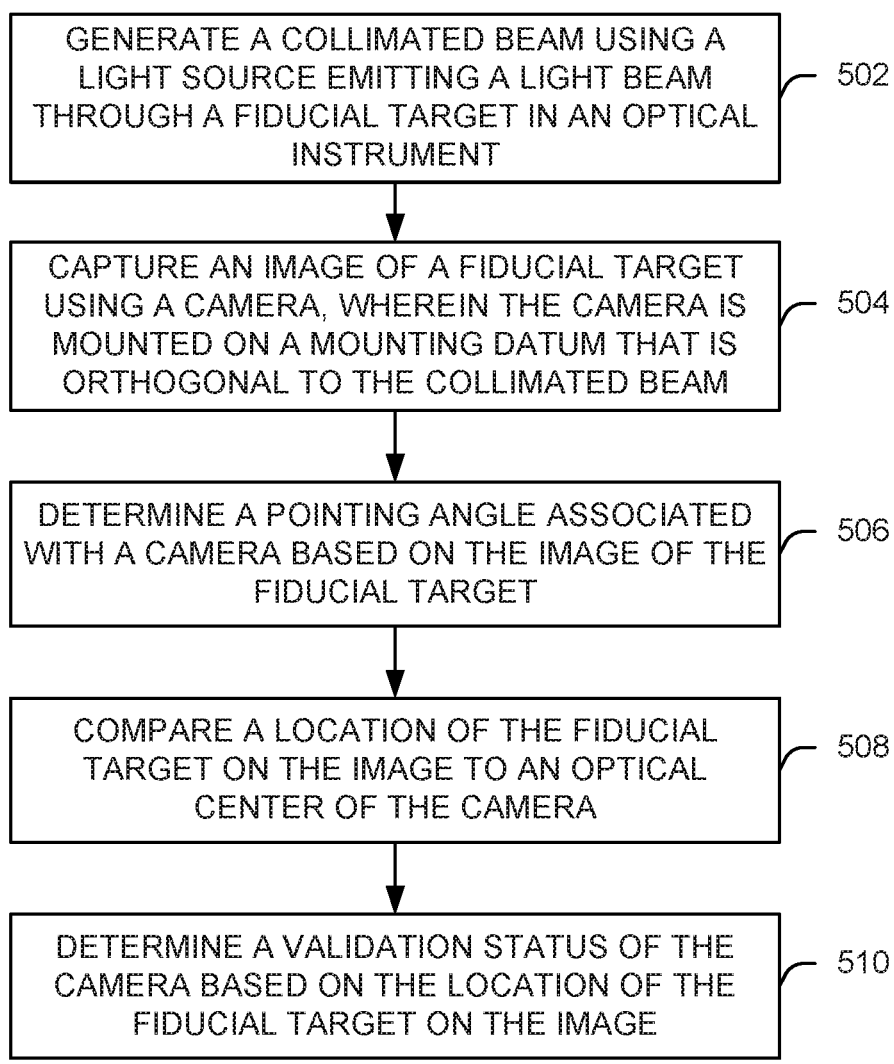
FIG. 5 illustrates a flow diagram of a process for an illustrative enhanced pointing angle validation system, in accordance with one or more example embodiments of the present disclosure.

FIG. 5 illustrates a flow diagram of process 500 for an illustrative enhanced pointing angle validation system, in accordance with one or more example embodiments of the present disclosure.

At block 502, a device may generate a collimated beam using a light source emitting a light beam through a fiducial target in an optical instrument. The optical instrument comprises an eyepiece situated to align a reflection of the light beam to a crosshair associated with an alignment reticle. The optical instrument is an autocollimator device or a collimator device. The optical instrument is selected based on design criteria associated with a focal length of the camera and a focal length of a collimator device. The design criteria are based on a ratio of the focal length of the collimator and the focal length of the camera being less than a ratio of a size of an opening on the collimator and number of pixels and a pixel pitch.

At block 504, the device may capture an image fiducial target using a camera, wherein the camera is mounted on a mounting datum that is orthogonal to the collimated beam.

At block 506, the device may determine a pointing angle associated with the camera based on the captured image of the fiducial target.

At block 508, the device may compare a location of the fiducial target in the image to an optical center of the camera.

At block 510, the device may determine a validation status of camera based on the location of the fiducial target in the image. The validation status is a pass or a fail status. The camera validation status is a pass status when the fixture angle is below the validation threshold. The camera validation status is a fail status when the fixture angle exceeds the validation threshold.

It is understood that the above descriptions are for purposes of illustration and are not meant to be limiting.

Figure 6:
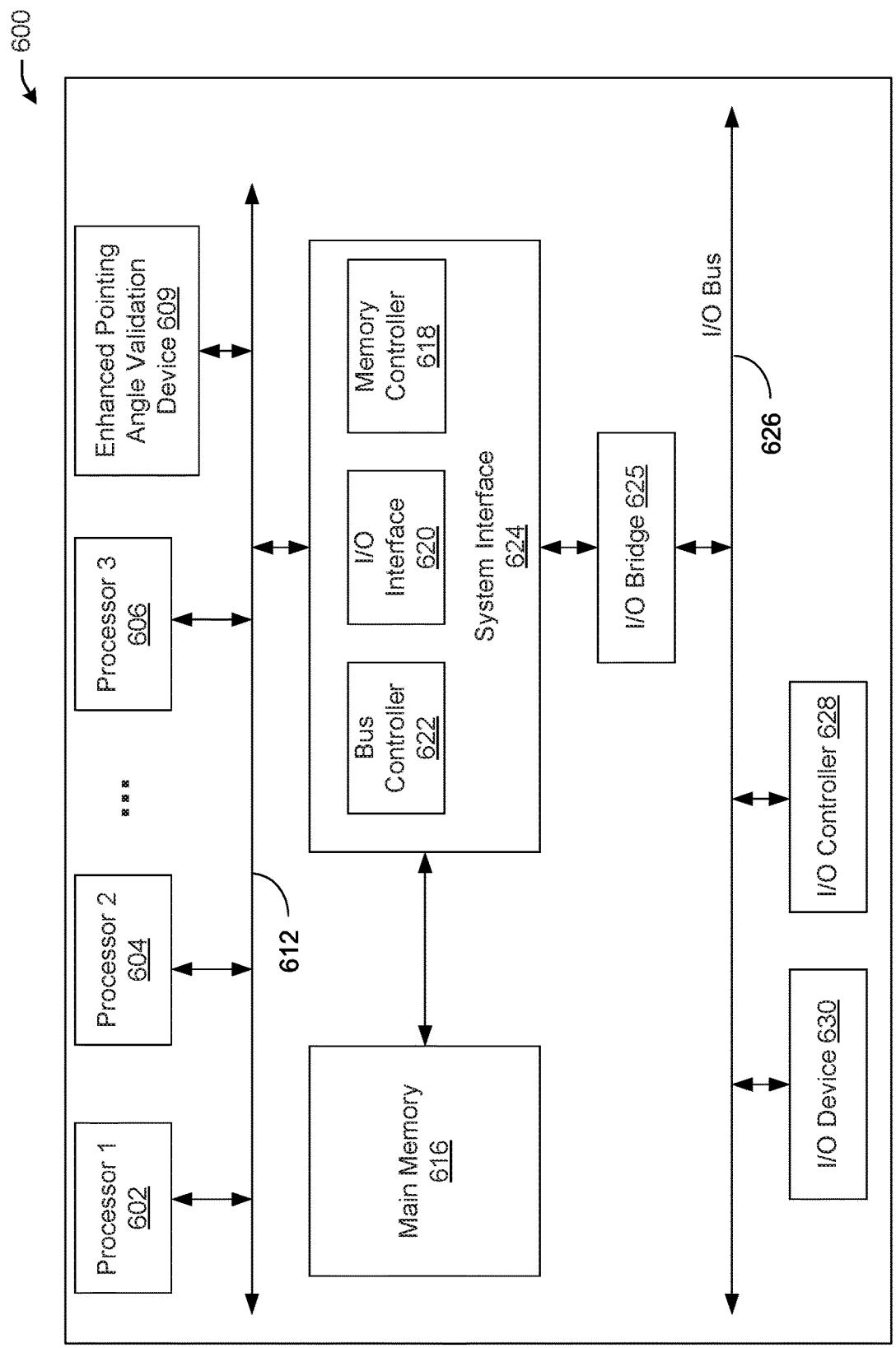
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 6 may represent the one or more vehicle computer 105 and an auxiliary operations computer 110 and/or computer system 230, 330, or 430 of FIGS. 2, 3, and 4. The computer system (system) includes one or more processors 602-606. Processors 602-606 may include one or more internal levels of cache (not shown) and a bus controller (e.g., bus controller 622) or bus interface (e.g., I/O interface 620) unit to direct interaction with the processor bus 612. An enhanced pointing angle validation device 609 may also be in communication with the Processors 602-606 and may be connected to the processor bus 612.

Processor bus 612, also known as the host bus or the front side bus, may be used to couple the processors 602-606 and/or the enhanced pointing angle validation device 609 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606 and/or the enhanced pointing angle validation device 609. Another type of user input device includes cursor control, such as a mouse, a trackball, or cursor direction keys for communicating direction information and command selections to the processors 602-606 and/or the enhanced pointing angle validation device 609 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606 and/or the my enhanced pointing angle validation device 609. Main memory 616 also may be used for storing temporary variables or other intermediate information during execution of instructions by the processors 602-606 and/or the enhanced pointing angle validation device 609. System 600 may include read-only memory (ROM) and/or other static storage device coupled to the processor bus 612 for storing static information and instructions for the processors 602-606 and/or the enhanced pointing angle validation device 609. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 and/or the enhanced pointing angle validation device 609 to perform the process steps described herein. In alternative embodiments, circuitry may be used in place of or in combination with the software instructions. Thus, embodiments of the present disclosure may include both hardware and software components.

The processors 602-606 and/or the enhanced pointing angle validation device 609 may facilitate a two-step process for alignment validation of a camera. The enhanced pointing angle validation system may align a collimated beam to a mounting datum on a fixture where a camera would be mounted. For example, an alignment validation system may align a light beam to be orthogonal to a mounting datum that will be used to mount the camera under test. This may be achieved by first mounting a mirror to the datum that will be used to mount the camera, and using an autocollimator to align the mounting datum such that the mirror is orthogonal to the beam. The autocollimator can be a digital (with internal camera and alignment calculation) or visual (with an eyepiece so the alignment is performed by eye).

The processors 602-606 and/or the enhanced pointing angle validation device 609 may facilitate in the first step of alignment validation where a light beam source may generate light beams that may run through an optic (e.g., collimator lens). The optic may create an image of the source when the beam is collimated such that all the rays from the light beam may be parallel to each other. Using an alignment mirror that is mounted adequately to a mounting datum, which is situated on an adjustment fixture that provides a fine adjustable tip/tilt to align the mirror to be orthogonal to the light beam.

The processors 602-606 and/or the enhanced pointing angle validation device 609 may facilitate using an autocollimator as a collimator source to validate the alignment of a camera. In a second step of the two-step process, an enhanced pointing angle validation system may facilitate replacing the mirror with a camera under test. The camera under test may capture an image of a collimated source using the autocollimator. For example, after the alignment is achieved, the mirror is removed, the camera under test is mounted, and the autocollimator is used as a standard collimator. The collimated beam may be created with a light source that contains an image of a pinhole or other fiducial target. Since the light beam is collimated, the apparent image of the pinhole may be focused at infinity which appears to be infinitely far away, and any displacement of the image of the pinhole or other fiducial target, as imaged by the camera under test, may indicate a pointing angle deviation. The pointing angle can be calculated using the values of the focal length of the optics in the camera under test and the optical center (a.k.a. principal point), which can be measured externally to this test and used as input.

The processors 602-606 and/or the enhanced pointing angle validation device 609 may collect data associated with captured images of objects situated in the line of sight of a camera under test. For example, the data may indicate a location of an aperture (e.g., a pinhole or another fiducial target) image within the image plane relative to the optical center of the camera. The processors 602-606 and/or the enhanced pointing angle validation device 609 may use the data captured by the camera to determine the relative location of objects within an image. The processors 602-606 and/or the enhanced pointing angle validation device 609 may perform calculations to determine the pointing angle of the camera. The processors 602-606 and/or the enhanced pointing angle validation device 609 may facilitate one or more calculations to validate whether the camera under test meets the required performance based on comparing the pointing angle to various thresholds.

The processors 602-606 and/or the enhanced pointing angle validation device 609 may determine deviations between the optical center of the camera under test and the aperture image. For example, the pointing angle of the camera under test may then be compared to an angle deviation threshold to determine whether the camera under test is aligned to an expected level. For example, in case the pointing angle is greater than the deviation threshold, then the alignment of the camera may be determined to be in a failed state. If the pointing angle is less than or equal to the deviation threshold, then the alignment of the camera may be determined to be in a pass state.

The processors 602-606 and/or the enhanced pointing angle validation device 609 may facilitate one or more design parameters associated with a design of an autocollimator. The design of the autocollimator may need to adhere to one or more design parameters such that the autocollimator provides enough pixels across the measured image of the aperture image. However, not too large to the point that the image of the aperture is not clearly visible since the aperture is small in size. The one or more design parameters may be based on the size of the aperture (e.g., a diameter of a pinhole, length of a slot, etc.), the number of pixels across an image taken by the camera, and/or the pixel pitch (density of pixels)). Since pixel pitch indicates the amount of space between two pixels, a smaller pixel pitch means there is less empty space between pixels.

The processors 602-606 and/or the enhanced pointing angle validation device 609 may facilitate advantages such that an autocollimator may be used as both a setup tool to align the beam to be orthogonal to known mechanical datums and after the alignment has been performed the autocollimator may be used as a collimated source for the camera under test. Current approaches to testing cameras with collimated beams do not have a standard way of setting the initial alignment, so the pointing angle of a camera cannot be accurately measured. Using an autocollimator will also allow for a beam alignment that has an accuracy that is orders of magnitude better than typical, and even tight, requirements for pointing angle in computer and machine vision camera systems.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In one or more embodiments, a system for camera alignment validation may comprise: an optical instrument for an object orientation measurement; an adjustment fixture for varying an orientation of the object attached to the adjustment fixture, wherein the object may include a camera or a mirror; a mounting fixture for attaching the object to the adjustment fixture; and an alignment validation module for determining an orthogonality of the light beam using reflection onto an alignment reticle, when the object may be a camera, and wherein the alignment validation module may be used for determining a validation status of the object, when the object may be the camera. The optical instrument may comprise an eyepiece situated to align the reflection of the light beam to a crosshair associated with an alignment reticle. The optical instrument may be an autocollimator device or a collimator device. The optical instrument may be selected based on a design criteria associated with a focal length of the camera and a focal length of a collimator device. The design criteria may be based on a ratio of the focal length of the collimator and the focal length of the camera being less than a ratio of a size of an opening on the collimator and number of pixels and a pixel pitch. The validation status may be a pass or a fail status. The system further comprises a comparison module that compares a fixture displacement to a validation threshold. The validation status may be a pass status when the fixture angle may be below the validation threshold. The validation status may be a fail status when the fixture angle exceeds the validation threshold.

In one or more embodiments, a method may comprise creating, by one or more processors, a collimated beam using a light source emitting a light beam through a fiducial target in an optical instrument; capturing an image fiducial target using a camera, wherein the camera may be mounted on a mounting datum that may be orthogonal to the collimated beam; determining a pointing angle associated with camera based on the captured image of the fiducial target; comparing a location of the fiducial target in the image to an optical center of the camera; and determining a validation status of camera based on the location of the fiducial target in the image.

The optical instrument comprises an eyepiece situated to align a reflection of the light beam to a crosshair associated with an alignment reticle. The validation status may be a pass or a fail status. The optical instrument may be an autocollimator device or a collimator device. The optical instrument may be selected based on a design criteria associated with a focal length of the camera and a focal length of a collimator device. The design criteria may be based on a ratio of the focal length of the collimator and the focal length of the camera being less than a ratio of a size of an opening on the collimator and number of pixels and a pixel pitch. The camera validation status may be a pass status when the fixture angle may be below the validation threshold. The camera validation status may be a fail status when the fixture angle exceeds the validation threshold.

In one or more embodiments, a non-transitory computer-readable medium storing computer-executable instructions which when executed by one or more processors result in performing operations may comprise: creating a collimated beam using a light source emitting a light beam through a fiducial target in an optical instrument; capturing an image fiducial target using a camera, wherein the camera may be mounted on a mounting datum that may be orthogonal to the collimated beam; determining a pointing angle associated with camera based on the captured image of the fiducial target; comparing a location of the fiducial target in the image to an optical center of the camera; and determining a validation status of camera based on the location of the fiducial target in the image.

The optical instrument comprises an eyepiece situated to align a reflection of the light beam to a crosshair associated with an alignment reticle. The validation status may be a pass or a fail status. The optical instrument may be an autocollimator device or a collimator device. The optical instrument may be selected based on a design criteria associated with a focal length of the camera and a focal length of a collimator device. The design criteria may be based on a ratio of the focal length of the collimator and the focal length of the camera being less than a ratio of a size of an opening on the collimator and number of pixels and a pixel pitch.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system comprising:
   an optical instrument operable to perform orientation measurements of an object;
   an adjustment fixture operable to vary an orientation of the object attached to the adjustment fixture, wherein the object includes a camera or a mirror;
   a mounting fixture that attaches the object to the adjustment fixture; and
   an alignment validation module configured to determine a validation status of the object, when the object is the camera.

2. The system of claim 1, wherein the alignment validation module is further configured to determine an orthogonality of a light beam using a reflection onto an alignment reticle, when the object is the mirror; and
   wherein the optical instrument comprises an eyepiece situated to align the reflection of the light beam to a crosshair associated with the alignment reticle of the optical instrument.

3. The system of claim 1, wherein the optical instrument is an autocollimator device or a collimator device.

4. The system of claim 1, wherein the optical instrument is selected based on one or more design parameters associated with a focal length of the camera and a focal length of a collimator device.

5. The system of claim 4, wherein the one or more design parameters are based on a ratio of the focal length of the collimator device and the focal length of the camera being less than a ratio of a size of an opening on the collimator device and number of pixels and a pixel pitch.

6. The system of claim 1, wherein the validation status is a pass or a fail status.

7. The system of claim 1, wherein the system further comprises a comparison module that compares a fixture displacement to a validation threshold.

8. The system of claim 7, wherein the validation status is a pass status when the fixture displacement is below the validation threshold.

9. The system of claim 7, wherein the validation status is a fail status when the fixture displacement exceeds the validation threshold.

10. A method comprising:
    generating, by one or more processors, a collimated beam using a light source emitting a light beam through a fiducial target in an optical instrument;
    capturing an image of a fiducial target using a camera, wherein the camera is mounted on a mounting datum that is orthogonal to the collimated beam;
    determining a pointing angle associated with a camera based on the image of the fiducial target;
    comparing a location of the fiducial target on the image to an optical center of the camera; and
    determining a validation status of the camera based on the location of the fiducial target on the image.

11. The method of claim 10, wherein the collimated beam comprises a first collimated beam, the method further comprising:
    mounting a mirror to a mounting datum;
    aligning a reflection of the light beam to a crosshair associated with an alignment reticle;
    generating, by the one or more processors, the first collimated beam using the light source emitting the light beam through the fiducial target in the optical instrument toward the mirror;
    removing the mirror from the mounting datum;
    mounting the camera to the mounting datum;
    generating, by the one or more processors, a second collimated beam using the light source emitting a second light beam through the fiducial target toward the camera; and
    capturing the image of the fiducial target using the camera, wherein the camera is mounted on the mounting datum that is orthogonal to the second collimated beam.

12. The method of claim 10, wherein the validation status is a pass or a fail status.

13. The method of claim 10, wherein the optical instrument is an autocollimator device or a collimator device.

14. The method of claim 10, further comprising:
    selecting the optical instrument based on one or more design parameters associated with a focal length of the camera and a focal length of a collimator device.

15. The method of claim 14, wherein the one or more design parameters are based on a ratio of the focal length of the collimator device and the focal length of the camera being less than a ratio of a size of an opening on the collimator device and number of pixels and a pixel pitch.

16. A non-transitory computer-readable medium storing computer-executable instructions which when executed by one or more processors result in performing operations comprising:
    generating a collimated beam using a light source emitting a light beam through a fiducial target in an optical instrument;
    capturing an image of a fiducial target using a camera, wherein the camera is mounted on a mounting datum that is orthogonal to the collimated beam;
    determining a pointing angle associated with a camera based on the image of the fiducial target;

comparing a location of the fiducial target on the image to an optical center of the camera; and determining a validation status of the camera based on the location of the fiducial target on the image.

17. The non-transitory computer-readable medium of claim 16, wherein the optical instrument comprises an eyepiece situated to align a reflection of the light beam to a crosshair associated with an alignment reticle.

18. The non-transitory computer-readable medium of claim 16, wherein the validation status is a pass or a fail status.

19. The non-transitory computer-readable medium of claim 16, wherein the optical instrument is an autocollimator device or a collimator device.

20. The non-transitory computer-readable medium of claim 16, wherein the optical instrument is selected based on one or more design parameters associated with a focal length of the camera and a focal length of a collimator device.

* * * * *